United States Patent [19]

Bachhuber et al.

[11] Patent Number: 5,111,901

[45] Date of Patent: May 12, 1992

[54] ALL WHEEL STEERING SYSTEM

[75] Inventors: Anthony A. Bachhuber; Donald H. Verhoff, both of Oshkosh, Wis.

[73] Assignee: Oshkosh Truck Company, Oshkosh, Wis.

[21] Appl. No.: 660,981

[22] Filed: Feb. 27, 1991

Related U.S. Application Data

[63] Continuation of Ser. No. 390,728, Aug. 8, 1989, abandoned.

[51] Int. Cl.$^5$ .............................................. B62D 6/02
[52] U.S. Cl. .................................... 180/140; 180/142; 180/143; 280/91
[58] Field of Search .............. 180/140, 141, 142, 143; 280/91

[56] References Cited

U.S. PATENT DOCUMENTS

| | | | |
|---|---|---|---|
| 4,175,638 | 11/1979 | Christensen | 180/140 |
| 4,588,039 | 5/1986 | Uno | 180/140 |
| 4,638,883 | 1/1987 | Moriizumi | 180/140 X |
| 4,645,025 | 2/1987 | Ohe | 180/142 X |
| 4,768,602 | 9/1988 | Inoue | 180/140 |
| 4,883,138 | 11/1989 | Kameda | 180/249 |
| 5,048,629 | 9/1991 | Abe et al. | 280/91 |

FOREIGN PATENT DOCUMENTS

| | | | |
|---|---|---|---|
| 0026366 | 2/1984 | Japan | 180/140 |
| 0097465 | 4/1988 | Japan | 180/140 |
| 0095974 | 4/1989 | Japan | 180/140 |
| 2170452 | 8/1986 | United Kingdom | 180/140 |
| 2196590 | 5/1988 | United Kingdom | 180/140 |

Primary Examiner—Mitchell J. Hill
Attorney, Agent, or Firm—Baker & McKenzie

[57] ABSTRACT

An all wheel steering system for heavy vehicles such as airport and municipal service vehicles. The system includes several display devices to inform the operator of the operational status of various components of the system. A rear wheel lock-out is provided to ensure safe operation by preventing rear steering above a pre-set vehicle speed. The system can be adjusted so that rear steering response timing and front and rear steering range angles can be varied to fit particular applications.

20 Claims, 4 Drawing Sheets

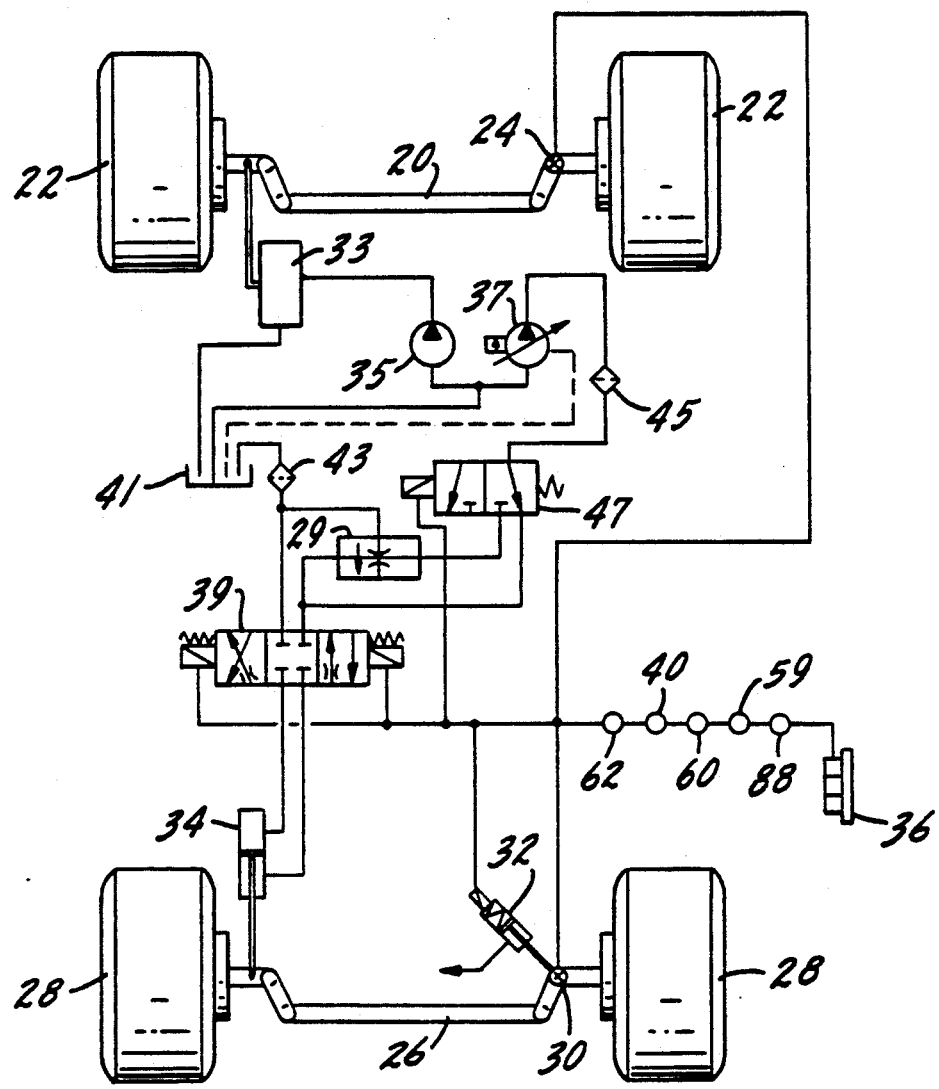
Fig.2.
 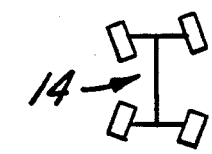  
Fig.1.
(STEERING MODES)

ALL WHEEL STEERING SYSTEM

This application is a continuation of application Ser. No. 390,728, filed Aug. 8, 1989 now abandoned.

BACKGROUND AND SUMMARY OF THE INVENTION

The invention relates to a steering system for heavy vehicles in which tight cornering and a high degree of maneuverability are important features. In particular, the invention relates to a steering system in which the front and rear wheels of a vehicle can be operated in a variety of modes, including front only, coordinated (or radiarc), crab, and rear/front independent.

Systems for controlling the steering of vehicles have included mechanical systems like the one shown in U.S. Pat. No. 3,903,983, in which cables and related mechanisms are arranged so that a rear steering lever is made to mechanically follow on depend upon front wheel steering. U.S. Pat. No. 4,175,638 shows an electronically controlled four wheel steering system in which electronic controls for selecting steering modes and for independently controlling rear wheel steering are mounted adjacent to one another on a lever or control panel.

The steering systems discussed above, and other prior art steering systems generally, have lacked several important features relating to safety, reliability and versatility. Clearly displaying the status of various aspects of the system has been limited. Complete and exact status information is important for safe operation. Examples of vehicles where four wheel steering is used, both on and off road, are runway sweeping machines, tow-tractors, refueling vehicles, crash/fire rescue vehicles, snow-plowing and blower vehicles, and military on-off road all-wheel drive vehicles.

It is an object of the present invention to provide a steering system which is efficient and which provides the operator with a variety of important system status information.

Another object of the invention is to provide a steering system which can be safely operated in a variety of modes.

Another object of the invention is to provide a steering system which limits the speed at which the vehicle can be operated while in a particular mode.

Another object is to provide a steering system in which various controls can be adjusted to meet the needs of a particular user or a particular application.

A further object is to provide a steering system in which modes may be changed while the vehicle is in motion.

Yet another object of the present invention is to provide a steering system in which the angle of disposition of the rear wheels is graphically displayed in order to assist the operator.

These and other objects and advantages of the invention are obtained with a steering system which has front end and rear sensors which generate a signal corresponding to the position of the wheels of a vehicle. The sensors are part of a circuit which is used to control the steering system. The control unit can be set to a variety of steering modes so that the vehicle can be operated in at least four different ways, namely, "front only", "coordinated" (rear wheel steering movement opposite to that of the front), "crab" (rear and front move the same way), and "independent" (rear and front wheels are independently controlled). The system includes a rear steering lockout which is comprised of a pin which prevents steering of the rear wheels. The lockout may be set to activate at a predetermined vehicle speed. The system also includes a way of adjusting the range of steering angles through which the wheels are allowed to move.

BRIEF DESCRIPTION OF THE DRAWINGS

These and other aspects of the invention will be better understood upon a reading of the following specification, read in conjunction with the following drawings wherein:

FIG. 1 is a series of four schematic diagrams which show the modes in which the steering system of the present invention may be operated; and FIG. 2 is a schematic diagram of a vehicle showing the general arrangement of the controls and operational elements of the system of the present invention.

DETAILED DESCRIPTION OF THE INVENTION

Figure 3:
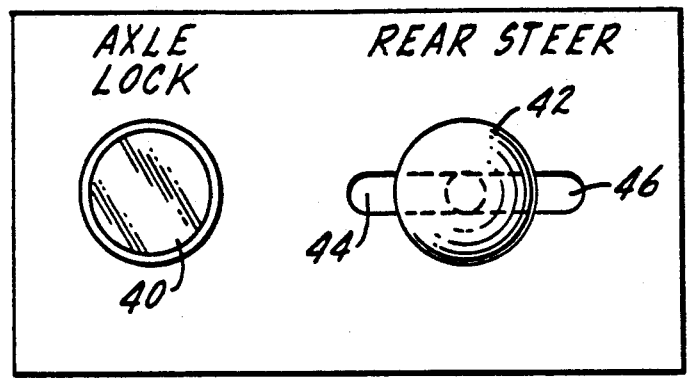
FIGS. 3 through 5 show display and switching panels which are used with the present invention.

The four wheel steering system of the present invention has the capability of operating in the four modes shown in FIG. 1. In the "front only" mode 12, the rear wheels are held in the center position, and the front wheels may be steered with a standard steering wheel. In the "coordinated" mode 14, the movement of the rear wheels 28 is controlled by operation of the front wheels. However, movement of the rear wheels is opposite in direction relative to movement of the front wheels. In the "crab" mode 16, movement of the rear wheels is dependent on and in the same direction as movement of the front wheels. Finally, in the "independent" mode 18, movement of the front wheels is controlled with a steering wheel, while movement of the rear wheels is controlled by operation of a joystick (see FIGS. 3 and 6).

FIG. 2 shows a plan schematic view of several of the mechanical components of the steering system of the present invention. Front axle 20 carries front wheels 22, the orientation of which is monitored by angle sensor 24. Similarly, rear axle 26 carries rear wheels 28, the angular orientation of which is monitored by angle sensor 30. The rear axle lock-out 32, when activated, prevents steering motion of the rear wheels. Front steering mechanism 33 and rear steering mechanism 34 are each hydraulically operated by a standard steering pump 35 and a load sensing rear steering pump 37. The steering system further includes a hydraulic reservoir 41, a return filter 43 and a pressure filter 45, a solenoid valve 47, and a priority flow regulator 29. The control unit 36, which may be located in the cab of the vehicle, is a central switching point for several of the various components of the steering system of the present invention. As shown in FIG. 2, those components include an electro-hydraulic valve 39, mode switches 62, speed switch 88, speed switch reset 60, lock out indicator 40, priority flow solenoid valve 47, lockout mechanism 32, and diagnostic indicators 59.

Figure 4:
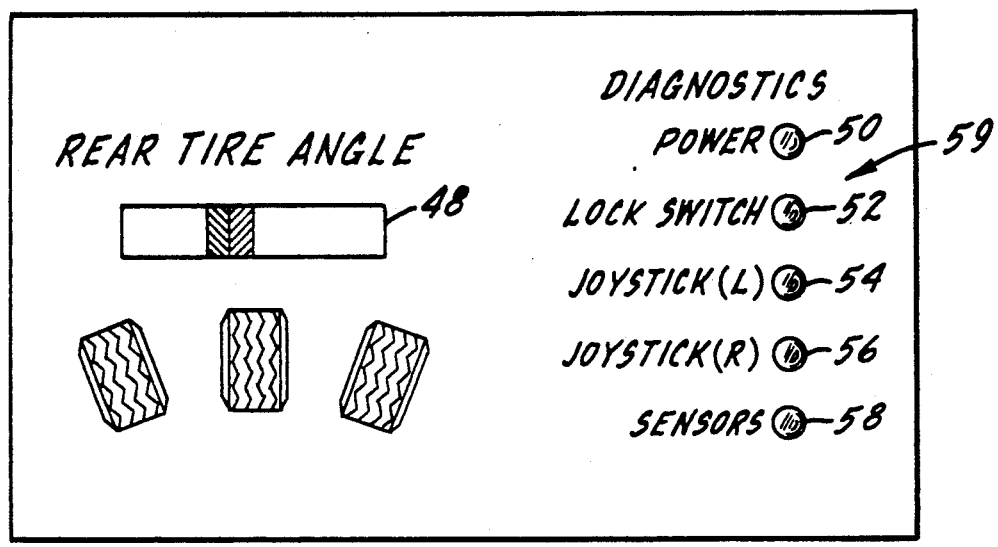
Figure 5:
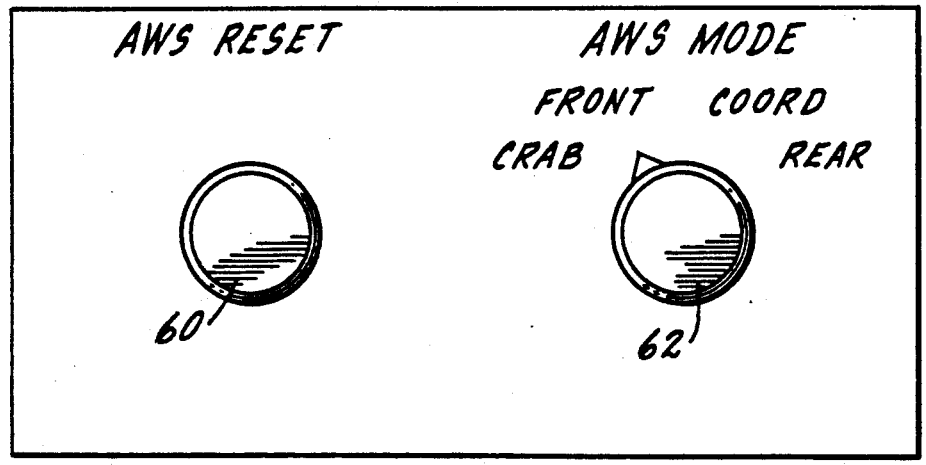

FIGS. 3, 4 and 5 show some of the displays and controls which are part of the steering system. FIG. 3 shows a lock-out indicator light 40 which, when lit, indicates that the rear axle lock-out 32 is disengaged. When the light 40 is not lit, the rear axle lock-out is engaged. The display 40 is important because steering of the rear wheels of a vehicle at even moderate speeds can be dangerous. As will be explained later, the speed at which the lock-out is automatically engaged should normally be set at 20 m.p.h. However, the speed at which lock-out occurs can be adjusted in the steering system of the present invention. Also shown in FIG. 3 is the rear steering control, which is preferably a joystick 42, which operates between an extreme left position 44 and an extreme right position 46. The joystick locks into its center detented position. A lift tab (not shown) is required to be pulled up in order to unlock the joystick. The joystick is of the friction-hold type, so any position from center can be set and held without the operator's hand being on the unit. While in the rear mode, positioning the joystick 42 in the center position causes the rear wheels to be centered. In other systems which employ a momentary rocker switch, the rear wheels must be adjusted to center without clear information as to when centering has occurred.

FIG. 4 shows another display in which a light emitting diode (LED) bar graph 48 shows the angular position of the rear wheels. The light emitting diode (LED) graph 48 operates in all modes to indicate the position of the rear tires. When the joystick 42 is moved to the position 46, the entire left half of the bar graph 48 is lit. When the joystick is moved to an intermediate position between the center and the extreme positions, there will be a lit portion, extending from the center, which corresponds to the angle of the rear wheels.

In addition, FIG. 4 shows a series 59 of indicator lights. The indicator light 50 indicates that power to the steering system is on. The indicator light 52 indicates that the lock-out pin is engaged. It should be noted that the lock-out indicator 40 discussed above indicates that the lock-out mechanism is unlocked, whereas the indicator light 52 indicates that the lock-out pin is, in fact, engaged. Light 40 goes out at approximately the same time that light 52 goes on. The light 40 going off is a positive indicator of the rear axle being locked. The indicator lights 54 and 56 indicate that power is being supplied to the left and right sides of the joystick potentiometer. Finally, the indicator light 58 shows whether power is being delivered to the wheel angle sensors 24 and 30. Additional indicating LEDs are located on the integrated proportional amplifiers 120 and 122 indicating the amplifier status, and on the speed switch 88, indicating presence or absence of the pulse generator signal.

FIG. 5 shows two important switches which are part of the steering control of the present invention. The reset switch 60 is a momentary toggle switch which, when thrown, causes the lock-out 32 to disengage the rear axle in order to allow all-wheel steering. Reset will only disengage the rear axle when two conditions are met, i.e. 1) the vehicle speed is under 20 mph, and 2) the joystick is in the center position. Finally, the rotary switch 62 determines the mode in which the system operates. The four positions correspond to the four modes discussed in FIG. 1.

Figure 6:
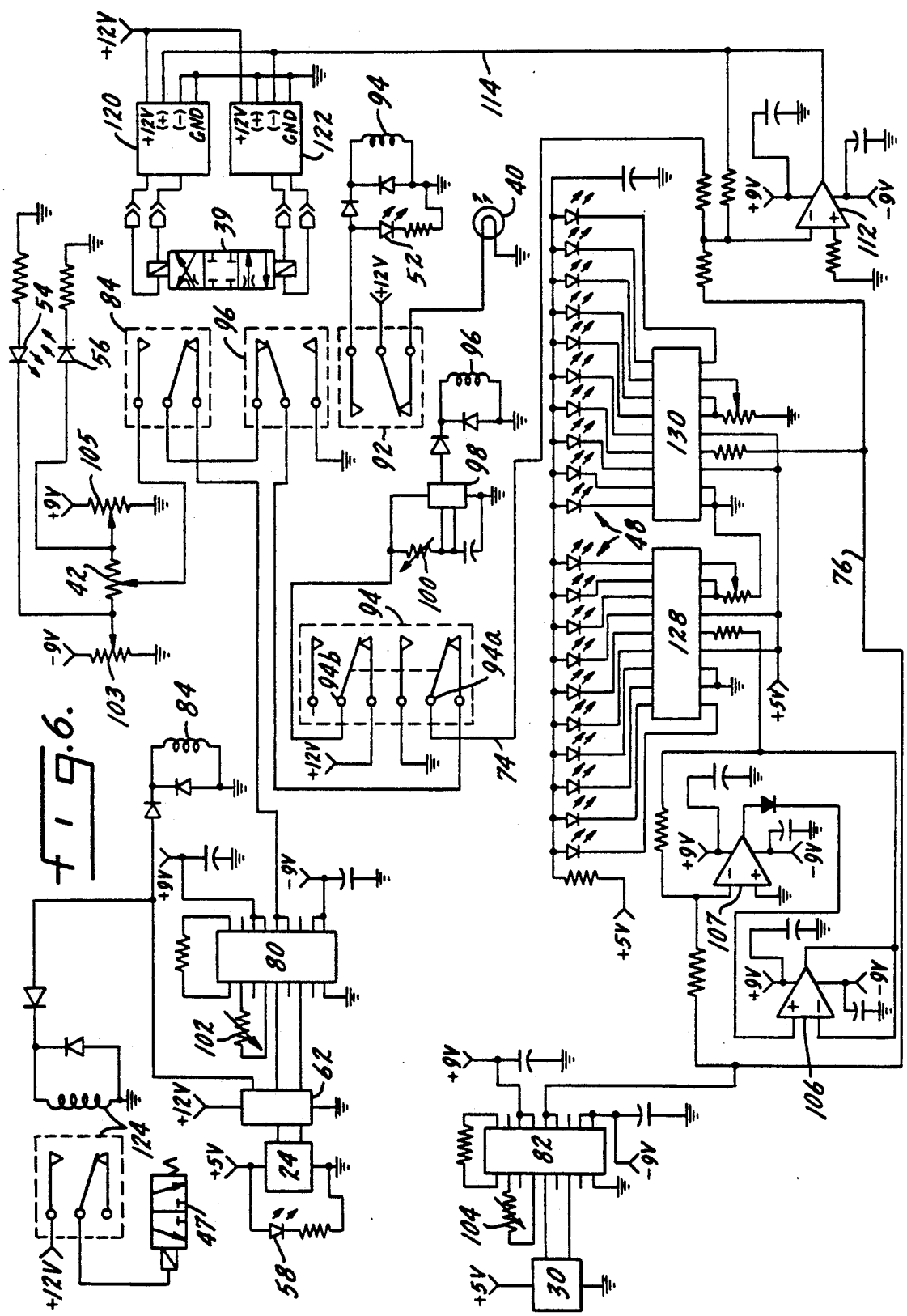
FIG. 6 is a schematic diagram of the circuit used to control the steering system of the present invention.

The main steering circuit shown generally in FIG. 6 operates as a closed loop position feedback system. The angle sensors 24 and 30 generate command and feedback signals 74 and 76, respectively, which are processed by the electronic control unit of the system. For purposes of clarity, the corresponding switching portions and activation coil portions of the relays shown in the circuit have been separated on the drawings, but have been given the same reference numerals.

The front wheel sensor 24 and the rear wheel sensor 30 are rotary variable inductance transducers (RVIT), each of which provides a differential output voltage [±2 volts DC per ±40 degrees] proportional to the degree of steering of the respective front and rear wheels. As the front wheels are steered from left to right, the voltage at the output of the RVIT 24 changes from positive to negative in proportion to the steering angle. This becomes the position command signal. The RVIT 30 produces the voltage which provides the position feedback signal. This system is a null-seeking system. Therefore, the polarity of the input signal must be opposite in polarity, but equal in magnitude, to the feedback signal for the system to reach equilibrium, causing the valve to center. The two voltages are amplified by the instrumentation amplifiers 80 and 82, and are summed together by precision operational amplifier 112, and any difference between these two voltages is passed on as the rear steering signal 114 to the integrated proportional amplifiers 120 and 122. These amplifiers 120 and 122 process the rear steering signal 114 from the summing amplifier 112, and drive the electro-hydraulic proportional valve 39 to properly orient the rear wheels.

As shown in FIG. 6, the mode switch 62 lies between the front RVIT 24 and a command signal instrumentation amplifier 80. Similarly, the rear RVIT 30 produces a signal which is processed by a second instrumentation amplifier 82. When the mode switch 62 is set for the front steering mode 12, the signal from the front RVIT is cutout and set to a false zero signal. Since the RVITs are mounted such that a zero volt output will occur when the wheels are straight ahead, and the system is null-seeking, this false zero will cause the electro-hydraulic proportional valve to position the rear wheels straight ahead. The polarity of the command RVIT 24 must be properly phased relative to the feedback RVIT 30 in order to provide the "coordinated" mode 14. Since the system is null-seeking, the input voltage must be opposite the polarity of the feedback signal. For the "coordinated" mode, this condition must be met as the wheels are going in the opposite directions. By switching the polarity of the front wheel RVIT 24, we can control the direction of movement of the rear wheels in relation to the front wheels. Thus, we can alternate from "crab" mode 16 to "coordinated" mode 14.

Finally, in the "independent" mode 18, the joystick 42 is activated through the relay 84. Changes in realtive polarity of the command and feedback signals should be done by varying the polarity of the front RVIT 24 so that a constant phase relationship may be maintained between the rear RVIT 30 and the electro-hydraulic valve 39.

The indicator lights or LEDs 54 and 56 indicate power to the left and right sides of the joystick potentiometer, respectively. The joystick 42 is equipped with a switch 86, which is part of the subcircuit shown in FIG.

Figure 8:
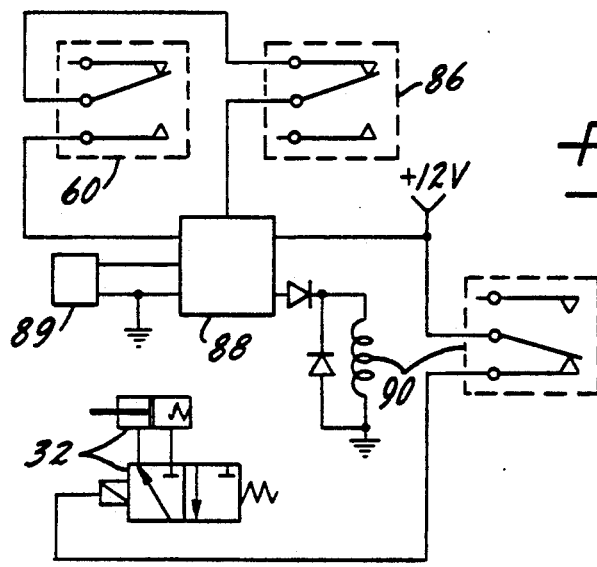
FIG. 8 is a schematic diagram of the circuit used to control a safety feature of the system of the present invention.

8. The switch 86 is activated by centering of the joystick. The subcircuit of FIG. 8 controls the activation and resetting of the air-operated rear wheel lock out mechanism 32. The center switch 86 must be activated in order to allow the reset switch 60 to be activated. The variable speed switch 88, together with the pulse generator 89, triggers the engagement of the rear wheel lock-out at a predetermined vehicle velocity. When the vehicle reaches the predetermined velocity, the relay 90 is de-activated, causing the air-operated lock-out pin mechanism 32 to engage the rear axle 26 when the driver re-centers the rear tires. Reverse Relay Logic is used. The pin engages without power and unlocks with power, thus providing a fail safe mode if power is lost.

Referring again to FIG. 6, a microswitch 92 is triggered by engagement of the pin of the lock-out mechanism 32. When the switch 92 is thrown, the lock switch LED 52 is lit, and the lock-out indicator 40 goes off. When the lock switch LED 52 goes on, the relay 94 is also activated. Activation of the relay 94 has two consequences. First, the command signal is grounded, making the rear wheels stay at the center position. Second, current is prevented form flowing through the timing oscillator 98. When the lock-out pin 32 is removed and switch 92 returns to its normally open position relay 94 is deactivated, at which time the lower portion 94a of the relay 94 completes part of the command circuit, and the upper portion 94b of the relay 94 activates the timing oscillator 98 and relay 96. For the adjustable time delay, relay 96 will be activated to send ground as the command signal, thus holding the rear wheels straight ahead for a few seconds. This occurs when relay 94 is de-activated and +12 volts are fed to the timing oscillator. The delay of the completion of the command circuit may be adjusted by varying the potentiometer 100. The delay of the timing oscillator is to prevent any steering of the rear axle prior to complete removal of the pin of the lock-out mechanism 32. If steering is allowed to occur immediately upon closing of the switch 92, jamming or shearing of the pin could occur.

One part of the feedback signal 76 is processed by the unique combination of two operational amplifiers 106 and 107 shown in FIG. 6. When signal 76 is on an negative swing, it will be converted to a positive voltage and LED driver 128 will drive one half of the LED bar graph display. On a positive swing, this voltage will be converted to zero, thus LED driver 128 will be off.

The other part of the feedback signal 76 is fed directly to LED driver 130. On a positive swing, this voltage will cause LED driver 130 to drive the other half of the LED bar graph display in the other direction. On a negative swing, LED driver 130 will be off.

Thus the LEDs sweep from center in the direction that the rear wheels are turning. No LEDs on means that the rear tires are centered.

The adjustability of the steering system of the present invention is an important aspect. By adjusting the potentiometers 102 and 104, which are connected to the instrumentation amplifiers 80 and 82, the range of steering angles of the front and rear wheels, respectively, can be adjusted. For example, in the "coordinated" and "crab" modes, the range angle of the rear wheels can be made to match the range angle of the front wheels, approximately 28° to 32°. In addition, the range angle of the rear wheels can be modified by adjusting the potentiometers 103 and 105 so that in the rear steering mode the rear range angle can be either different from or the same as the range angle as determined by the settings of potentiometers 102 and 104. As used in this specification, the term "range angle" refers to the included angle between a steered wheel in its center position and its full right or left position.

It should also be noted that by adjusting the priority flow regulator 29, the speed at which the rear wheels respond to the joystick control 42 may be adjusted. When the mode selector is in the rear mode 18 relay 124 (See FIG. 6) is activated, which in turn activates a 3-way solenoid valve 47. This valve directs the hydraulic flow through the priority flow regulator 29, which in turn regulates the amount of flow to the rear steering system. Thus, determining the reaction time of rear wheel steering in the rear mode 18. In the "coordinated" and "crab" modes, the speed at which the rear wheels move through the range angle should be approximately the same as the speed at which the front wheels move through their range angle. When in the "independent" mode, fast changes of the rear steering angle can be dangerous. Therefore, the steering speed of the rear wheels in the "independent" mode should be approximately half of the speed at which the rear wheels move in the "coordinated" and "crab" modes.

The speed of steering the rear wheels can be adjusted by varying the potentiometers located on the integrated proportional amplifiers 120 and 122. The valve deadband can be eliminated by potentiometer adjustments here also.

Figure 7:
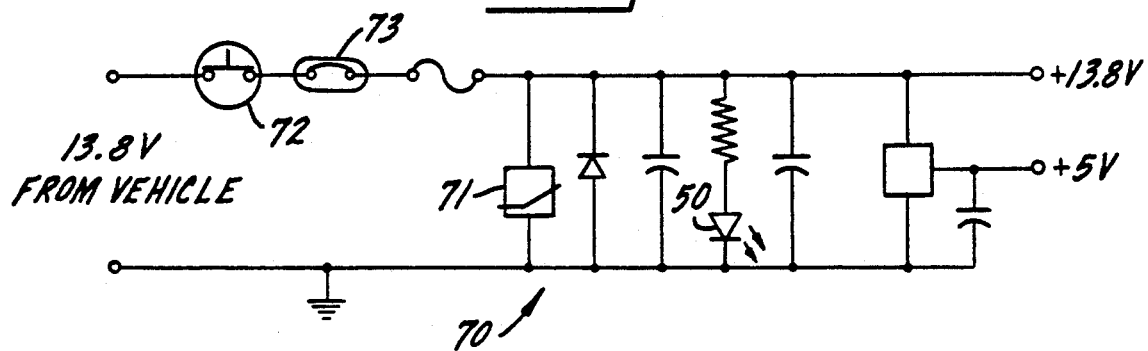
FIG. 7 is a schematic diagram of the circuit used to deliver power to the circuit shown in FIG. 6.
Figure 9:
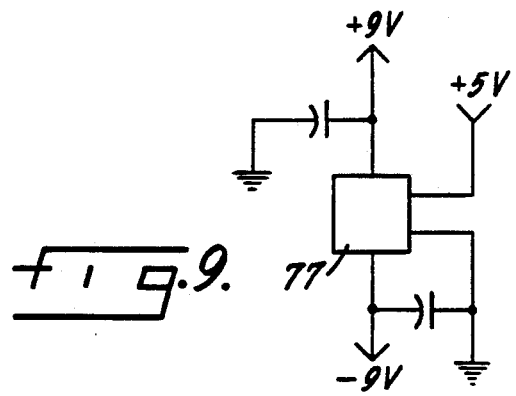
FIG. 9 is a schematic diagram of a DC to DC converter used to supply voltage to various points in the circuit of FIG. 6.

In FIG. 7, the subcircuit 70 shows the power coming from the vehicle to the steering system, and the LED 50 discussed above is included in that subcircuit. The parking brake stop light switch 72 must be released in order for power to reach the steering system. The subcircuit 70 includes a transient overvoltage suppressor 71 and self resetting circuit breaker 73. FIG. 9 shows a DC to DC converter 77, which is used to convert the 5 volt supply of subcircuit 70 to a positive and negative 9 volt power source.

The invention has been described with respect to a particular embodiment. However, there are numerous alternatives, modifications and variations which will occur to those skilled in the art. All such alternatives, modifications and variations are intended to fall within the scope of the appended claims.

I claim:

1. A four wheel steering system for a vehicle comprising front and rear pairs of steerable wheels, control means for selecting a plurality of steering modes, said modes including a first mode in which steering of said rear pair of wheels is generally fixed, a second mode in which movement of said rear pair of wheels is generally opposite to that of said front pair, a third mode in which movement of said rear pair is generally similar to that of said front pair, and a fourth mode in which movement of said rear and front pairs of wheels can be controlled independently and simultaneously from a single steering control location, locking means for limiting steering of said rear pair of wheels, said locking means being automatically actuated when said vehicle exceeds a predetermined vehicle speed.

2. A steering system in accordance with claim 1 wherein:
said control means includes means for adjusting the predetermined vehicle speed, at which said locking means is activated.

3. A steering system in accordance with claim 1 wherein:

said control means includes lock indicator means for informing an operator as to actual physical engagement and disengagement of said locking means with operating mechanisms which cause movement of said rear pair of wheels.

4. A steering system in accordance with claim 1 wherein:
engagement of said locking means prevents said system from operating in any mode other than said first mode until said locking means is disengaged.

5. A steering system in accordance with claim 1 including:
rear wheel display means for constantly informing an operator as to the orientation of said rear pair of wheels.

6. A steering system in accordance with claim 5 wherein:
said rear wheel display means includes a graphic imaging device, said device producing a display which is proportional to the steering angle of said rear pair of wheels.

7. A steering system in accordance with claim 1 wherein:
movement of said rear pair of wheels when said second and third modes are selected is substantially faster than movement of said rear pair of wheels when said fourth mode is selected, speed of said movements being relatively adjustable to a predetermined front/rear ratio.

8. A steering system in accordance with claim 7 wherein:
said ratio is about 1:1 for said first and second modes and about 2:1 for said fourth mode.

9. A steering system in accordance with claim 1 wherein:
said system includes display means for informing an operator as to operational status of mechanism for causing movement of said pair of rear wheels, and for informing an operator as to operational status of sensors used to detect positions of said front and rear pairs of wheels.

10. A steering system in accordance with claim 1 wherein:
movement of said front pair of wheels between their center positions and their extreme left and right positions defines a front steering range angle, and movement of said rear pair of wheels between their center positions and their extreme left and right positions defines a rear steering range angle, said rear steering range angle being generally equal in magnitude to said front steering range angle when said system is in said second mode and said third mode, said front steering range angle and said rear steering range angle defining a range angle ratio.

11. A steering system in accordance with claim 10 wherein:
said control means includes means for adjusting said range angle ratio.

12. A four wheel steering system for a vehicle comprising front and rear pairs of steerable wheels, control means for selecting a plurality of steering modes, said modes including a first mode in which steering of said rear pair of wheels is generally fixed, a second mode in which movement of said rear pair of wheels is generally opposite to that of said front pair, a third mode in which movement of said rear pair is generally similar to that of said front pair, and a fourth mode in which movement of said rear and front pairs of wheels can be controlled independently and simultaneously from a signal steering control location, locking means for limiting steering of said rear pair of wheels, said locking means being automatically actuated when said vehicle exceeds a predetermined vehicle speed,
said system including rear wheel display mean for constantly informing an operator as to the orientation of said rear pair of wheels.

13. A steering system in accordance with claim 12 wherein:
said control means includes means for adjusting the predetermined vehicle speed, at which said locking means is activated.

14. A steering system in accordance with claim 12 wherein:
said control means includes lock indicator means for informing an operator as to actual physical engagement and disengagement of said locking means with operating mechanisms which cause movement of said rear pair of wheels.

15. A steering system in accordance with claim 12 wherein:
engagement of said locking means prevents said system from operating in any mode other than said first mode until said locking means is disengaged.

16. A steering system in accordance with claim 12 wherein:
said rear wheel display means includes a graphic imaging device, said device producing a display which is proportional to the steering angle of said rear pair of wheels.

17. A steering system in accordance with claim 12 wherein:
movement of said rear pair of wheels when said second and third modes are selected is substantially faster than movement of said rear pair of wheels when said fourth mode is selected, speed of said movements being relatively adjustable to a predetermined front/rear ratio.

18. A steering system in accordance with claim 17 wherein:
said ratio is about 1:1 for said first and second modes and about 2:1 for said fourth mode.

19. A steering system in accordance with claim 12 wherein:
said system includes display means for informing an operator as to operational status of mechanisms for causing movement of said pair of rear wheels, and for informing an operator as to operational status of sensors used to detect positions of said front and rear pairs of wheels.

20. A steering system in accordance with claim 12 wherein:
movement of said front pair of wheels between their center positions and their extreme left and right positions defines a front steering range angle, and movement of said rear pair of wheels between their center positions and their extreme left and right positions defines a rear steering range angle, said rear steering range angle being generally equal in magnitude to said front steering range angle when said system is in said second mode and said third mode, said front steering range angle and said rear steering range angle defining a range angle ratio, said control means including means for adjusting said range angle ratio.

* * * * *